UNITED STATES PATENT OFFICE.

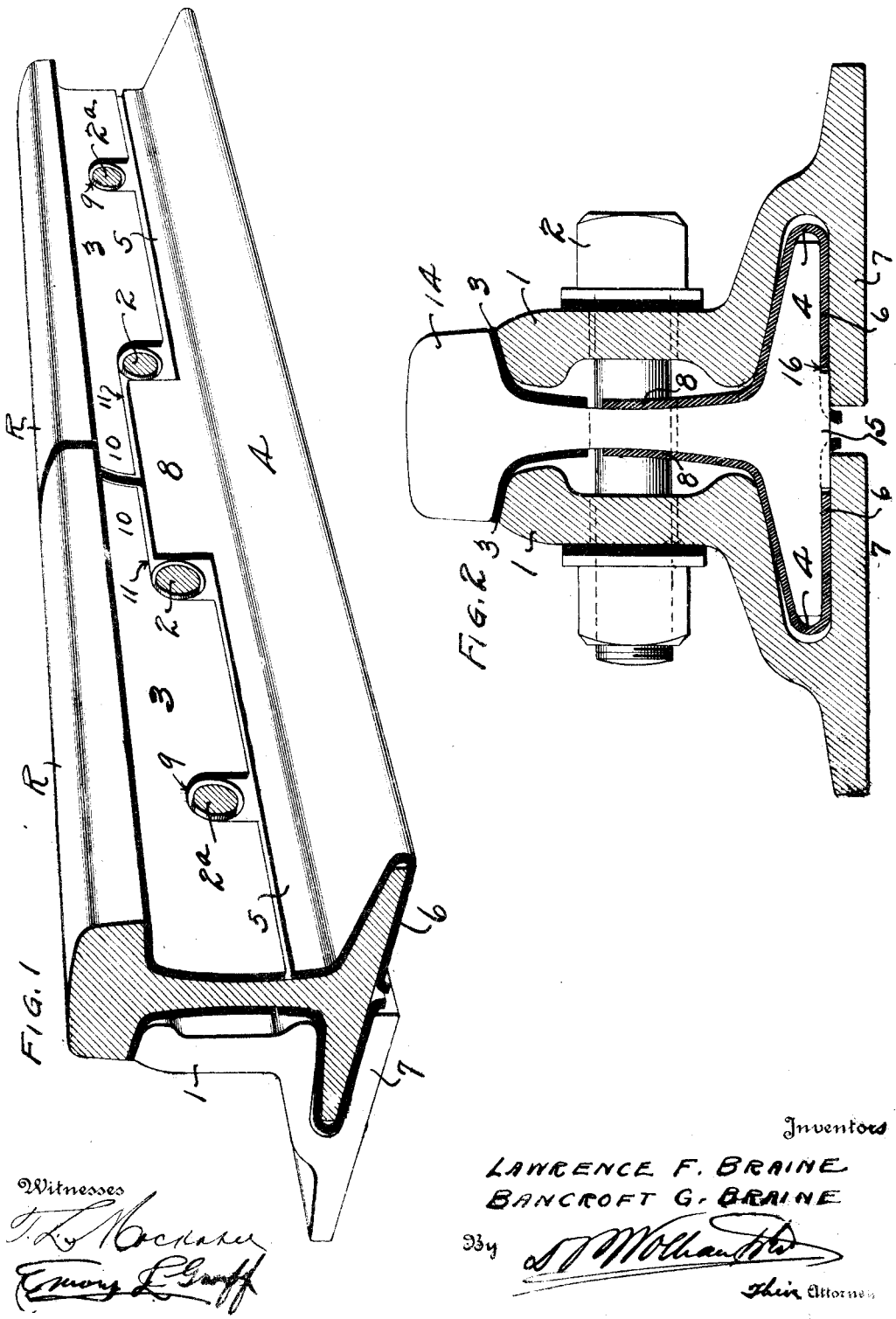

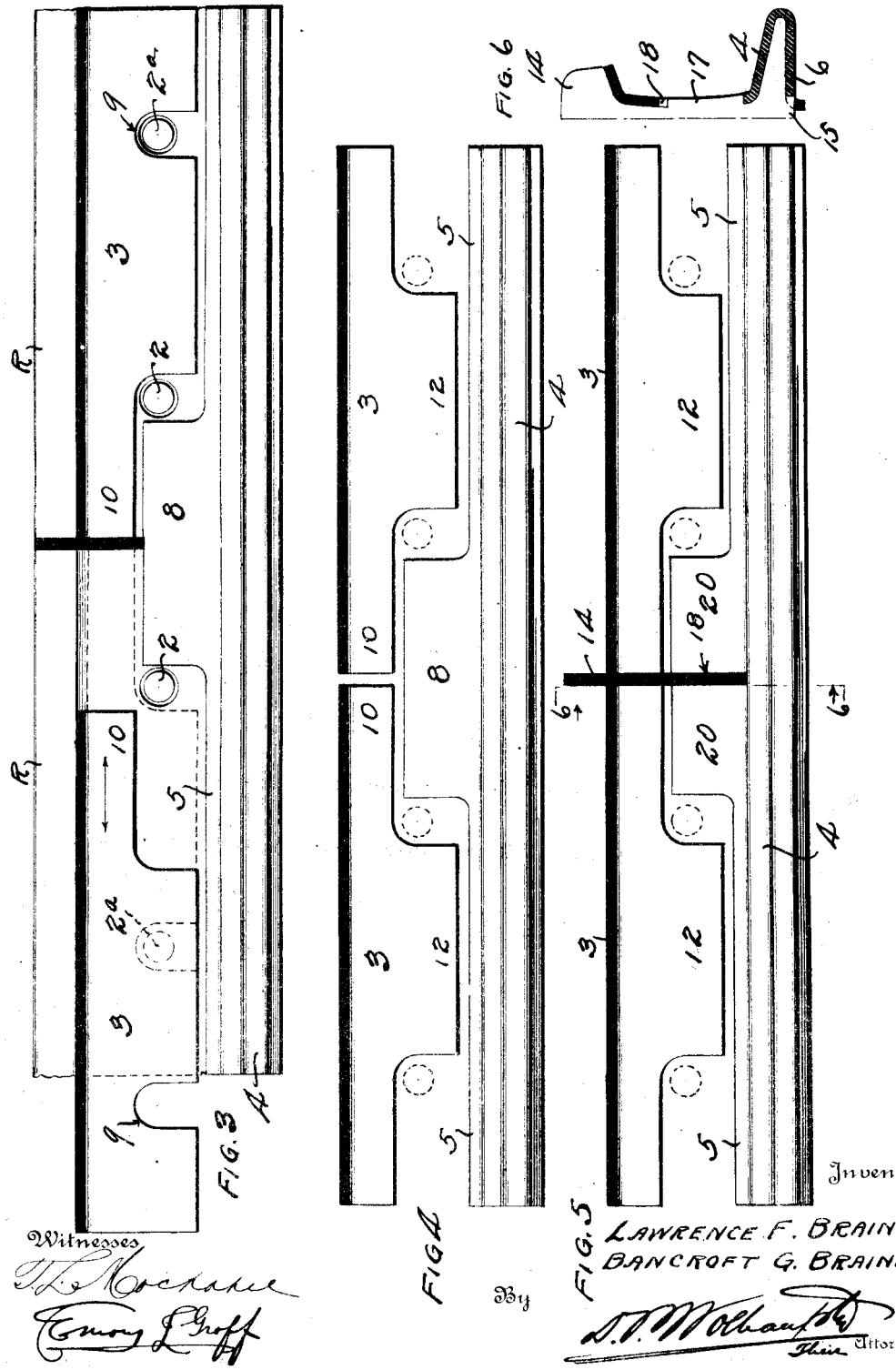

LAWRENCE F. BRAINE AND BANCROFT G. BRAINE, OF NEW YORK, N. Y., ASSIGNORS TO THE RAIL JOINT COMPANY, OF NEW YORK, N. Y., A CORPORATION OF NEW YORK.

RENEWABLE INSULATION FOR RAIL-JOINTS.

1,133,920. Specification of Letters Patent. Patented Mar. 30, 1915.

Application filed December 23, 1914. Serial No. 878,750.

*To all whom it may concern:*

Be it known that we, LAWRENCE F. BRAINE and BANCROFT G. BRAINE, citizens of the United States, residing at New York, in the county of New York and State of New York, have invented certain new and useful Improvements in Renewable Insulation for Rail-Joints, of which the following is a specification.

This invention relates to insulation for rail joints, and particularly to the sectional or divided type of insulation which includes an upper piece or section for the rail head insulation and a lower piece or section for the rail flange insulation.

With respect to this type of insulation, the invention has for its primary object a novel improvement in the construction and arrangement of the separate pieces of insulation in order to facilitate and expedite the removal and replacement of the pieces of insulation which are subjected to the greatest wear, while at the same time retaining the feature of an interlock between the separate pieces of insulation and the joint bolts in order to prevent relative longitudinal movement or creeping of the insulation when the pressure and traction of the load is imposed thereon.

Accordingly, the present invention is designed to meet the practical difficulties which have been experienced in applying and replacing the upper insulation plates of the sectional or divided type of insulation. One of these difficulties arises from the fact that when the joint bars and joint bolts are in position, the ordinary rail head insulation plates having bolt engaging means cannot be inserted from the ends of the joint, because of bolt interference. Another difficulty experienced in the handling of the ordinary forms of rail head insulation plates exists because the angular shape of these plates prevents the convenient and ready introduction thereof into a rail joint laterally over the upper edges of the joint bars or splices. In fact, the conventional shape of these upper rail head insulation plates requires the metal joint bars to be separated from the rail to such an extent that the bolts could not be fastened home, and consequently, under such conditions, when these insulation plates are inserted laterally beneath the rail heads, the same fall below their proper relative positions with respect to the rail head and the splices.

These difficulties, incident to the handling of the ordinary insulation plates having bolt engaging means, are entirely obviated by the present invention which provides a simple and practical form of construction that not only locks the insulation plates in position so that they cannot be displaced longitudinally, but which also provides a practical and economical means whereby the head insulation plates of a sectional or divided insulation may conveniently be removed and inserted from the ends of the joint, with the joint bars substantially in proper position and loosely fitting the rails. This feature of the invention not only permits of the ready removal of a worn piece of insulation, but also serves to accurately guide the new piece of insulation to proper place and fit between the joint bar and the rail, and after the insertion of which a slight manipulation of the bolts is all that is necessary to completely lock the joint.

With these and other objects in view which will be apparent to those skilled in the art, the invention consists in the novel construction, combination, and arrangement of parts hereinafter more fully described, illustrated and claimed.

The invention is susceptible of considerable modification as to the minor details of construction and arrangement of parts, but preferable and practical embodiments thereof are shown in the accompanying drawings, in which—

Figure 1 is a perspective view of a rail joint, with one joint bar removed, illustrating sectional or divided insulation constructed in accordance with the present invention. Fig. 2 is a vertical cross sectional view of the joint shown in Fig. 1 at the center thereof, plainly illustrating the bolt clearance between the upper insulation plates at the center of the joint, and also illustrating the optional feature of the interlock between the insulating end post and the base insulation of the joint. Fig. 3 is a side elevation of a rail joint with the joint bar removed and the joint bolts in section, said view illustrating sectional or divided insulation constructed in accordance with the present invention and showing the manner of inserting or removing an upper insulation plate endwise. Fig. 4 is a detail side elevation of the sectional insulation illustrating a modification that may be resorted to in the manner of interlocking the separate insulation plates within the joint. Fig. 5 is a similar view of another modification preserving the distinct feature of the invention in combination with an end post interlocked with both the web and base portions of the lower base insulation plate. Fig. 6 is a detail bisected cross-sectional view on the line 6—6 of Fig. 5 showing the lateral and bottom interlock of the end post with the base insulation plate.

Similar reference characters designate corresponding parts throughout the several figures of the drawings.

In carrying forward the invention, no changes are required in the construction of the rail joint, and the improved insulation is therefore applicable to the various forms of splices that are employed in different types of insulated rail joints, so for illustrative purposes there is shown in Figs. 1 and 2 of the drawings a conventional design of rail joint including the rails R, R, the joint bars 1 and joint bolts 2, and associated with these parts is a sectional or divided insulation consisting of an upper insulation plate 3 and a lower insulation plate 4. The insulation plates 3 and 4 consist of separate pieces or sections of insulation made of fiber or equivalent insulating material, and the upper of these insulation plates 3 constitutes the rail head insulation, the same being interposed between the joint bar and the under side of the rail head. The other or lower insulation plate 4 constitutes the base insulation for the joint and is arranged to cover and insulate the rail base flange. By way of example, this lower insulation plate 4 is shown in the form of an insulating cuff fitting over the rail base flange and including at its upper edge a web portion 5 fitting the web of the rail, and having formed integral with its outer edge portion a base section 6 which underlies the rail base and insulates the same from the rail supporting base member 7 of the joint bar 1.

It is desirable and necessary, with sectional or divided insulation of this character, to provide means for preventing relative longitudinal movement or creeping thereof under the pressure and traction of the load. This may be provided for in various ways, as for instance by the expedients shown in Figs. 1 and 3 of the drawings. In this form of construction, the lower base insulation plate 4 is shown provided at the central part of its web portion 5 with an upwardly projecting holding ear extension 8 which projects into the center space between the central pair of joint bolts 2—2 thereby providing a double interlock between the joint bolts and the insulation plate 4 which secures the latter against the displacement referred to. Likewise, the upper insulation plate 3 is provided with bolt engaging means which, in the construction referred to, may consist of a holding notch 9 formed in the lower edge of its web portion and adapted to engage over one of the joint bolts which will therefore directly combine with the said notch 9 forming interlocking means that secures the plate against longitudinal displacement.

As heretofore noted, the distinctive feature of the present invention resides in so constructing the upper rail head insulation plate 3 that the same may be readily inserted and removed at and from the ends of the joint, with the joint bars and center bolts 2—2 in place. Provision is made for this manipulation by forming each upper insulation plate 3 with a terminal bolt-clearing guide tongue 10. This guide tongue is disposed within the longitudinal plane of the plate body and projects longitudinally from an end thereof. It is formed by shearing off a bottom corner of the insulation plate, as at 11, so that the cut away portion thus produced will receive one of the center bolts 2 of the joint and dispose the guide tongue 10 above the plane of the top line of the bolts. Accordingly, it will be apparent that this construction permits the endwise insertion or removal of the upper insulation plate in the manner referred to. This will be readily understood by reference to the preferable manner of assembling a rail joint embodying the improved insulation. This operation may be most readily accomplished by first inserting the lower base insulation plates or cuffs 4 in the crotches of the joint bars 1, after which the latter are placed over the rail flanges and the two center bolts 2—2 first put in place. These center bolts 2 are then tightened sufficiently to draw the joint bars nearly to place, but the end joint bolts which are designated by the reference characters 2ª—2ª are left out of the joint, thus leaving a pocket into which the upper insulation plate 3 may be inserted and guided to its proper place and fit, the guiding of said plate being materially assisted by the terminal guiding tongue 10 freely passing over the top of one of the center bolts 2. After thus positioning all of the upper or head insulation plates 3, the remaining joint bolts are inserted and the whole joint tightened up by all of the bolts.

The novel features of improvement referred to may be embodied in different forms of construction without affecting the principle or advantages of the invention. This is illustrated in Fig. 4 of the drawings. According to this modification, the upper insulation plate 3 may be made duplex or reversible. That is to say, the same can be of duplicate construction at both ends so that each end of the plate will be provided with a terminal bolt clearing guiding tongue 10, thereby permitting the plate to be reversibly used on either side of the joint. In this form of construction, a single depending holding tongue or web 12 is formed integrally with the central portion of the plate 3, and extends into the space between a pair of the joint bolts, while the interlock for the lower base insulation plate 4 may be made in any suitable manner, as for instance by a central holding projection, as previously referred to.

Another detail of construction that may be utilized to assist in locking the base insulation in place is that of an interlock between the insulating end post 14 and the base insulation. In the construction shown in Fig. 2, this may be accomplished by forming the insulating end post at its bottom edge with a bottom locking tenon 15 engaging keeper slots 16 in the base sections 6 of the plates 4. The same idea may be carried forward into the modification shown in Figs. 5 and 6 wherein the insulating end post is shown as provided, in addition to the tenon 15, with a side locking tenon 17 which interlocks within a side keeper slot 18 provided in a central upstanding web portion 20 of the lower base insulation plate 4. In this construction, the said projecting web portion 20 is disposed between the center pair of bolts, and therefore coöperates therewith to prevent longitudinal movement of the base insulation.

Various changes in the form, proportion, and minor details of construction may be resorted to without sacrificing any of the features or advantages of the herein described construction and without departing from the spirit of the invention, as expressed in the appended claims.

I claim:

1. An insulated rail joint including upper and lower insulation plates having bolt-engaging means, the upper plate also having a bolt clearance for endwise insertion in the joint.

2. An insulated rail joint including upper and lower insulation plates having bolt-engaging means, the upper plate also having a sheared terminal forming a bolt clearing guide for endwise insertion of the plate.

3. An insulated rail joint including upper and lower insulation plates having bolt-engaging means, the upper plate also having at an upper corner a longitudinally extending bolt clearing guide tongue to permit endwise insertion of the plate.

4. An insulated rail joint including an upper rail head insulation plate having bolt-engaging means, and a sheared terminal forming a bolt-clearing guide to admit of endwise insertion of the plate with certain bolts in position.

5. An insulated rail joint including an upper rail head insulation plate having means interlocking with one of the joint bolts, and other guiding means having a clearance from another joint bolt to admit of endwise insertion of the plate with certain bolts in position.

6. An insulated rail joint including an upper rail head insulation plate provided with holding means engaging a joint bolt to prevent longitudinal displacement of the plate, and also provided with a terminal sheared corner forming a longitudinally extended narrowed bolt clearing guide tongue arranged to clear a center bolt of the joint.

7. An insulated rail joint including an upper rail head insulation plate having bolt-engaging means to prevent longitudinal displacement, and also provided with duplex terminal bolt clearing guide tongues admitting of endwise insertion of the plate with certain of the bolts in position.

8. An insulated rail joint including an upper insulation plate having bolt engaging means, and a terminal bolt clearing guide tongue, a lower base insulation plate interlocked with the bolts, and an insulating end post interlocked with the base insulation plate.

9. An insulated rail joint including upper and lower insulation plates, the upper plate having bolt engaging means and a bolt clearance for endwise insertion in the joint, an insulating end post, and a lower plate having interlocking means engaging with the insulating end post.

10. An insulated rail joint including an upper rail head insulation plate having bolt engaging means, and a sheared terminal forming a bolt clearing guide to admit of endwise insertion of the plate with certain bolts in position, insulating end post, and a lower insulation plate having end post engaging means.

11. An insulated rail joint including an upper insulation plate having bolt engaging means and a terminal bolt clearing guide tongue, a lower insulation plate, and an insulating end post interlocked with the lower insulation plate.

In testimony whereof we hereunto affix our signatures in the presence of two witnesses.

LAWRENCE F. BRAINE.
BANCROFT G. BRAINE.

Witnesses:
BENJ. WOLHAUPTER,
E. F. SCHERMERHORN.